(12) United States Patent
Gatta et al.

(10) Patent No.: US 7,616,588 B2
(45) Date of Patent: Nov. 10, 2009

(54) SIMPLIFIED CREATION AND TERMINATION OF AN AD HOC WIRELESS NETWORK WITH INTERNET CONNECTION SHARING

(75) Inventors: Srinivas Raghu Gatta, Redmond, WA (US); Jean-Pierre Duplessis, Redmond, WA (US); Savas Guven, Redmond, WA (US); Scott Manchester, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

(21) Appl. No.: 11/096,042

(22) Filed: Mar. 31, 2005

(65) Prior Publication Data

US 2006/0221915 A1    Oct. 5, 2006

(51) Int. Cl.
*H04L 12/28* (2006.01)

(52) U.S. Cl. .................. 370/254; 370/338; 370/397; 370/400; 370/463

(58) Field of Classification Search .............. 370/254, 370/338, 397, 400, 463
See application file for complete search history.

(56) References Cited

U.S. PATENT DOCUMENTS

| | | | |
|---|---|---|---|
| 5,933,504 | A | 8/1999 | Vanstone et al. |
| 6,052,720 | A | 4/2000 | Traversat et al. |
| 6,078,667 | A | 6/2000 | Johnson |
| 6,148,354 | A | 11/2000 | Ban et al. |
| 6,178,507 | B1 | 1/2001 | Vanstone |
| 6,195,433 | B1 | 2/2001 | Vanstone et al. |
| 6,449,642 | B2 | 9/2002 | Bourke-Dunphy et al. |
| 6,526,264 | B2 | 2/2003 | Sugar et al. |
| 6,563,928 | B1 | 5/2003 | Vanstone et al. |
| 6,654,841 | B2 | 11/2003 | Lin |
| 6,687,492 | B1 | 2/2004 | Sugar et al. |
| 6,700,450 | B2 | 3/2004 | Rogers |
| 6,714,605 | B2 | 3/2004 | Sugar et al. |
| 6,728,517 | B2 | 4/2004 | Sugar et al. |
| 6,785,520 | B2 | 8/2004 | Sugar et al. |
| 6,850,735 | B2 | 2/2005 | Sugar et al. |
| 2001/0014153 | A1 | 8/2001 | Johnson |
| 2002/0090085 | A1 | 7/2002 | Vanstone et al. |
| 2002/0152380 | A1 | 10/2002 | O'Shea et al. |
| 2002/0152384 | A1 | 10/2002 | Shelest et al. |

(Continued)

OTHER PUBLICATIONS

The Cable Guy—Jun. 2004, "The New Wireless Network Setup Wizard in Windows XP Service Pack 2", published May 25, 2004, pp. 1-12.*

(Continued)

*Primary Examiner*—Barry W Taylor
(74) *Attorney, Agent, or Firm*—Marshall, Gerstein & Borun LLP

(57) ABSTRACT

Methods and systems are described for simplified creation of, connection to, and termination from an ad hoc wireless network. Graphical user interfaces are used to guide users though creation and joining ad hoc network. The option to share one user's Internet connection with the entire ad hoc network is also described. The ad hoc networks described can provide some managed services traditionally unavailable in ad hoc networks, such as IP address assignment and name resolution services. The ad hoc networks can be created with termination criteria, such that a computer's connection to the ad hoc network is automatically terminated and previous network configuration settings are restored when one or a combination of termination criteria are met.

13 Claims, 14 Drawing Sheets

U.S. PATENT DOCUMENTS

| | | | |
|---|---|---|---|
| 2003/0101247 A1 | 5/2003 | Kumbalimutt et al. | |
| 2003/0225971 A1 | 12/2003 | Oishi et al. | |
| 2004/0002943 A1 | 1/2004 | Merrill et al. | |
| 2004/0010429 A1 | 1/2004 | Vedula et al. | |
| 2004/0024875 A1 | 2/2004 | Horvitz et al. | |
| 2004/0038592 A1 | 2/2004 | Yang | |
| 2004/0192383 A1* | 9/2004 | Zacks et al. | 455/557 |
| 2006/0168153 A1* | 7/2006 | Lin | 709/220 |
| 2007/0111568 A1* | 5/2007 | Ferrari et al. | 439/131 |

OTHER PUBLICATIONS

Deb Shinder, "Windows XP Service Pack 2: How it affects wireless networking", Aug. 26, 2004, pp. 1-13.*

U.S. Appl. No. 11/060,290, filed Feb. 17, 2005, Madhavan et al.
U.S. Appl. No. 10/806,369, filed Mar. 23, 2004, Manchester et al.
U.S. Appl. No. 10/807,095, filed Mar. 23, 2004, Manchester et al.
U.S. Appl. No. 10/806,331, filed Mar. 23, 2004, Manchester et al.
U.S. Appl. No. 10/806,772, filed Mar. 23, 2004, Freeman et al.
U.S. Appl. No. 10/806,836, filed Mar. 23, 2004, Manchester et al.
U.S. Appl. No. 60/534,795, filed Jan. 7, 2004, Abraham et al.
U.S. Appl. No. 60/592,506, filed Jul. 30, 2004, Corbett et al.
U.S. Appl. No. 10/967,368, filed Oct. 18, 2004, Crosier et al.
U.S. Appl. No. 10/999,555, filed Nov. 30, 2004, Corbett et al.
Bailie, et al., "The Networked Digital Home," *Soundscapes Info*, (2002) printed Mar. 29, 2004, pp. 1-2, <http://icce.rug.nl/~soundscapes/VOLUME05/LSI_mediacast.html>.
Balfanz, et al., *Talking to Strangers: Authentication in ad hoc Wireless Networks*, In Symposium on Network and Distributed Systems Security, San Diego, California, 2002, printed Mar. 24, 2004, pp. 1-14, <http://citeseer.ist.psu.edu/balfanz02talking.htm>.
Harkins et al., *The Internet Key Exchange (IKE)*, Network Working Group RFC 2409, 1-41pp. (Nov. 1998).
Huang, et al., *Making Computers Disappear: Appliance Data Services*, pp. 1-14, Mobilcom 2001, Rome, Italy (2001).
Kent et al., *IP Authentication Header*, Network Working Group RFC 2402, 1-22 pp., Nov. 1998.
Kent et al., *IP Encapsulating Security Protocol*, Network Working Group RFC 2406, 1-22 pp. (Nov. 1998).
Maitland, *Okapi Unlocks iSCSI*, printed Mar. 24, 2004, pp. 1-9, (2003-2004) <http://www.byteandswitch.com/document.asp?doc_id=19173>.
Nexware Corporation, "Software Solutions: Networked Solutions," Nexwarecorp.com (2001), printed Mar. 29, 2004, pp. 1, <http://www.nexwarecorp.com/products/networked_solutions.htm>.
Rescorla, *Diffie-Hellman Key Agreement Method*, Network Working Group RFC 2631, 1-13 pp. (Jun. 1999).
Schroder, *USB Pen Drives: Large Portable Storage in a Tiny Package*, (Dec. 2003) printed Mar. 24, 2004, pp. 1-9, <http://networking.earthweb.com/nethub/article.php/10950-3291891_1>.
Unknown, *Using Smart Cards With the Sun Ray 1 Enterprise Appliance*, Revision 01, pp. 1-15, Palo Alto, California (Sep. 1999).
Unknown, *Integrating Sun Ray 1 Enterprise Appliances and Microsoft Windows NT*, Sun Microsystems, Inc., pp. 1-19, Palo Alto, California (2000).
Unknown, *Smart Card for Temporary Facilities Security*, Information Methods Incorporated Group, LLC, pp. 1-16, (Jan. 2004).
Unknown, *Sun Ray Overview*, Sun Microsystems, Inc., pp. 1-28, Santa Clara, California (Apr. 2003).
Unknown, *Sun Ray Interoperability Brief*, Sun Microsystems, Inc., pp. 1-14, Santa Clara, California (Aug. 2003).
Unknown, "Sun Ray," *Editor's Choice Communication Solutions*, (Jun. 2004) printed Mar. 26, 2004, pp. 1-8, <http://www.tmcnet.com/comsol/0601/0601lab2.htm>.
Unknown, "Linksys Instant Wireless USB Network Adapter WUSB11 Network Adapter," *Product Review*, (2004) printed Mar. 24, 2004, pp. 1-4, <http://hardwarecentral.dealtime.com/xPR_Linksys_Instant_Wireless_WUSB11>.
Wakefield, *Wireless Technology and Your Mobile Device*, Microsoft Support WebCast, transcript pp. 1-13, slides pp. 1-60, printed Oct. 31, 2002, <http://support.microsoft.com/default.aspx?acid+%2Fservicedesks%2Fwebcasts%2Fen%2Fwc103102.asp>.
Ylisaukko-Ojai, et al., *Low Capacity Wireless Home Networks—Cheap and Simple Interconnections between Devices*, pp. 1-20, Version 1.0, Ilkk Korhonen,(May 2002).

* cited by examiner

SIMPLIFIED CREATION AND TERMINATION OF AN AD HOC WIRELESS NETWORK WITH INTERNET CONNECTION SHARING

CROSS-REFERENCE TO RELATED APPLICATION

This application is related to co-pending application Ser. No. 10/806,836, filed Mar. 23, 2004 by Manchester, et al., entitled "CONFIGURING AN AD HOC WIRELESS NETWORK USING A PORTABLE MEDIA DEVICE" which is hereby incorporated by reference in its entirety for all that it teaches without exclusion of any part thereof.

FIELD OF THE INVENTION

This invention relates generally to the field of wireless computing and more particularly to the areas of ad hoc wireless networking and connection sharing.

BACKGROUND OF THE INVENTION

Wireless networking today is dominated by devices operating according to IEEE 802.11 protocols, such as 802.11b ("WiFi"). The 802.11 protocols provide for two distinct types of wireless networking: infrastructure and ad hoc. In an infrastructure network, a single device—usually a "wireless access point"—acts as a central server for providing managed services such as providing Internet Protocol addresses (via, e.g., DHCP) and IP address discovery and resolution (via, e.g., DNS). The wireless access point further is typically connected via physical connection to the Internet, and provides routing capabilities enabling wirelessly networked devices to access the Internet via the access point. All network communications in an infrastructure network pass through the wireless access point.

In an ad hoc network (or "computer to computer" network), networked computing devices communicate directly with one another in peer-to-peer fashion. Although one computer might set up the network, no centrally managed services exist. For this reason, ad hoc networks are typically small and closed, without access to external services.

The ability to quickly and easily set up an ad hoc wireless network is desirable in a number of scenarios. One simple example of such a scenario is when two or more users come together with their wireless enabled laptops computers; they may wish to participate and collaborate together for activities such as file sharing in a "peer-to-peer" fashion, without requiring a centralized server or hub to manage the network. In these situations, it is possible for the users to create an ad hoc network according to an IEEE 802.11 wireless protocol. However, although the 802.11 protocol provides the ability to create an ad hoc network, current software does not exist to ease and quicken the process; it is currently an extremely difficult, error-prone and time consuming process.

Furthermore, once set up, it is also currently difficult to "deconstruct" such a network, so that each participating computer is restored to its previous networking state. As a result, users of ad hoc networks may experience problems subsequently connecting to other wireless networks, or may find their computers attempting to reconnect to the ad hoc network at a later time, thereby disconnecting a new network connection.

Another shortcoming of existing ad hoc network creation and management tools is revealed when one computer in an ad hoc network has access to the Internet; other computers participating in the ad hoc network presently have no easy way of taking advantage of this accessibility.

Some existing computer operating systems include an Internet connection sharing (ICS) feature. This feature has been exclusively used by computing devices containing two network adapters. Typically, one network adapter is connected to a LAN or another computer; the other network adapter is connected to a WAN or the Internet. By invoking the ICS feature, other computers connected to the device (by the LAN or directly) are permitted to access the WAN or Internet. The ICS feature typically operates through a number of embedded networking components, such as DHCP and DNS services, but those embedded components have not historically been separable from the general ICS feature. Thus, if an application wished to access only one of the ICS components, it needed to be able to access the entire suite of ICS components.

However, the suite of ICS components has not been made available to devices containing only one network adapter. Thus, a computer containing only one network adapter on existing systems cannot avail itself of the embedded components of the ICS feature.

BRIEF SUMMARY OF THE INVENTION

The problems outlined are largely addressed by systems and methods for simplified creation and termination of ad hoc wireless networks, as described herein. The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

A shortcoming of existing wireless networking management systems is their inability to allow users to easily create and maintain ad hoc networks. Existing processes for creation of ad hoc networks are laborious and difficult for average users. Embodiments of the present invention address this shortcoming by simulating a simple managed environment in an unmanaged space. This is advantageous to users, who gain the ability to quickly and rapidly setup a network meeting space between themselves, without having to realize or understand all the different software pieces that work together to make this possible. Embodiments of the invention provide such functionality for networks supporting IPv4 or IPv6. Some embodiments of the invention facilitate a simplified, user-friendly process for creation of ad hoc networks through the use of graphical user interfaces including step-by-step instructions.

An additional feature found in embodiments of the invention is the ability to share one participant's Internet connection with the other participants on an ad hoc network. Such a feature is achieved by, for example, unbundling IP address assignment and name resolution services from packaged bundles of networking services, such as an existing Internet Connection Sharing package. This allows simplified management of selected network sharing services by leveraging the package's existing interfaces while alleviating restrictive requirements that might prohibit the use of the entire package.

Furthermore, embodiments of the invention include features for automatically terminating connection to an ad hoc network, and restoration of previous network settings. Automatic terminations can be triggered by any number of userspecified or default criteria, such as, for example, leaving the physical proximity of the ad hoc network, expiration of a fixed amount of time, or logging out of the computer by the user.

In one embodiment, a method is provided for establishing an ad hoc wireless network performable by a first computing device, the first computing device comprising a first wireless network adapter for communicating with the ad hoc network, and further comprising a second network adapter for communicating with a second network, the method comprising the steps of guiding a user of the first computing device through a process for generating network configuration parameters for creating the ad hoc network, informing the user of at least one method for transferring the network configuration parameters to a second computing device, by which the second computing device can connect to the ad hoc network, and allowing the second computing device to communicate with the second network through the ad hoc network and the second network adapter on the first computing device.

In another embodiment, a method is provided for establishing an ad hoc wireless network performable by a first computing device, the first computing device comprising a first wireless network adapter for communicating with the ad hoc network, the method comprising the steps of guiding a user of the first computing device through a process for generating network configuration parameters for creating the ad hoc network, informing the user of at least one method for transferring the network configuration parameters to a second computing device, by which the second computing device can connect to the ad hoc network, invoking a network protocol address assignment server on the first computing device to assign a network address to the second computing device after the second computing device has connected to the ad hoc network, and invoking a name resolution server on the first computing device to provide name resolution service to the second computing device.

In still another embodiment, a system is provided for establishing an ad hoc wireless network between two or more computing devices, each computing device comprising a wireless network adapter for communicating with the ad hoc network, the system comprising an ad hoc network initiator user interface for execution on a first computing device, a transfer mechanism for transferring ad hoc network configuration information from the first computing device to one or more other computing devices, and an ad hoc network joining user interface for execution on the one or more other computing devices, wherein the initiator user interface provides user instruction for using the transfer mechanism to convey the network configuration information, and wherein the joining user interface provides user instruction for using the transfer mechanism to input the conveyed network configuration information onto the one or more computing devices.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
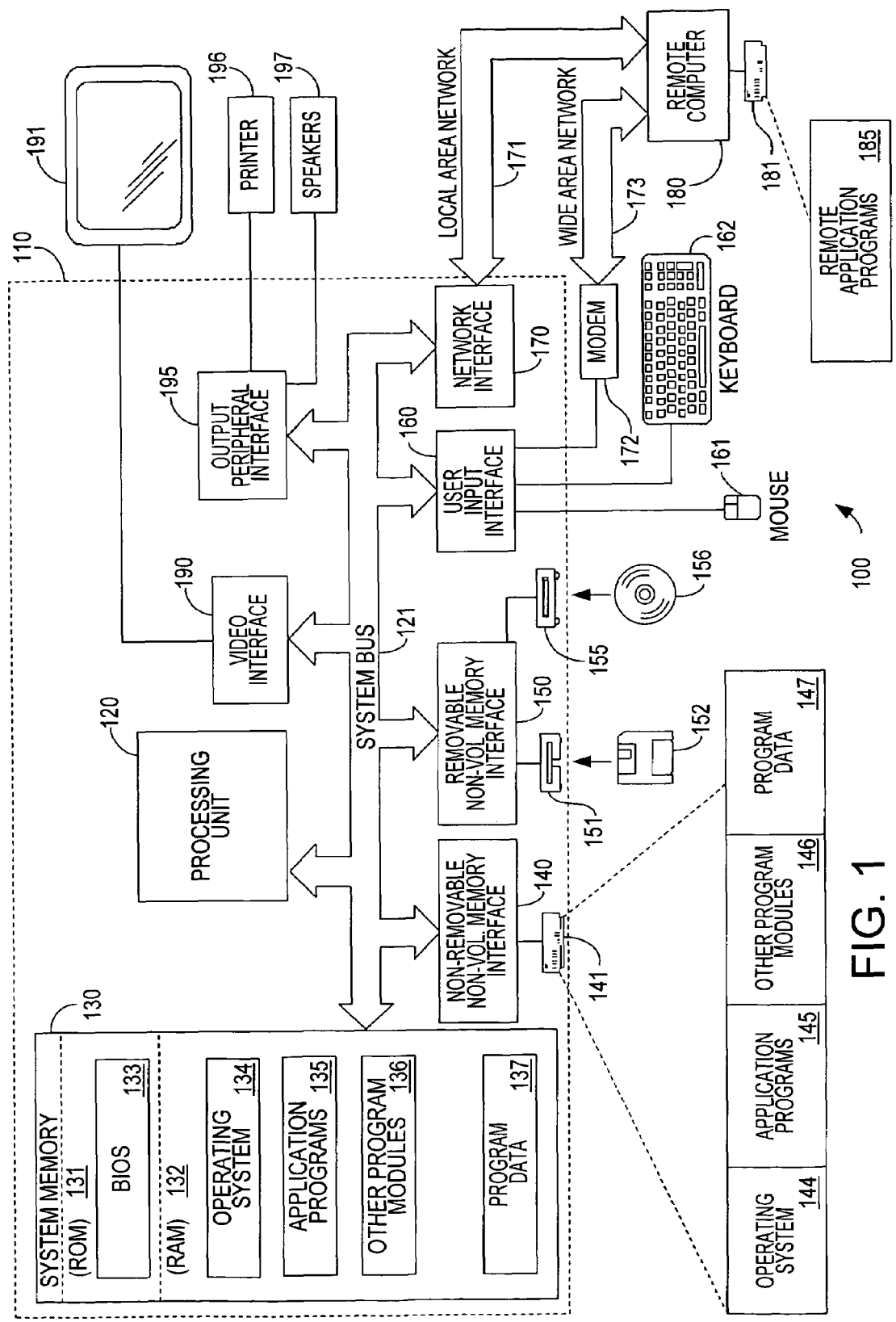
FIG. 1 is a simplified schematic illustrating an exemplary architecture of a computing device, usable to implement embodiments of the invention.

Methods and systems to simply create and terminate an ad hoc wireless network according to embodiments of the invention will now be described with respect to preferred embodiments; however, the methods and systems of the present invention are not so limited. Moreover, the skilled artisan will readily appreciate that the methods and systems described herein are merely exemplary and that variations can be made without departing from the spirit and scope of the invention. After reviewing this description, it will be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The present invention will be more completely understood through the following detailed description, which should be read in conjunction with the attached drawings. In this description, like numbers refer to similar elements within various embodiments of the present invention. Aspects of the invention are illustrated as being implemented in a suitable computing environment. Although not required, the invention will be described in the general context of computer-executable instructions, such as procedures, being executed by a computing device. Although the invention has applicability to portable computing devices, it will be appreciated that the same techniques apply to any computing device enabled for wireless network connectivity.

Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

FIG. 1 illustrates an example of a suitable computing system environment 100 on which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, a microphone, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 195 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. In particular, the computer 110 may also contain a wireless networking interface or wireless card, such as operating according to an IEEE 802.11 protocol. Additionally, the computer 110 may contain one or more additional wireless networking interfaces or wireless cards, such as operating according to GPRS or Bluetooth protocols.

Figure 2:
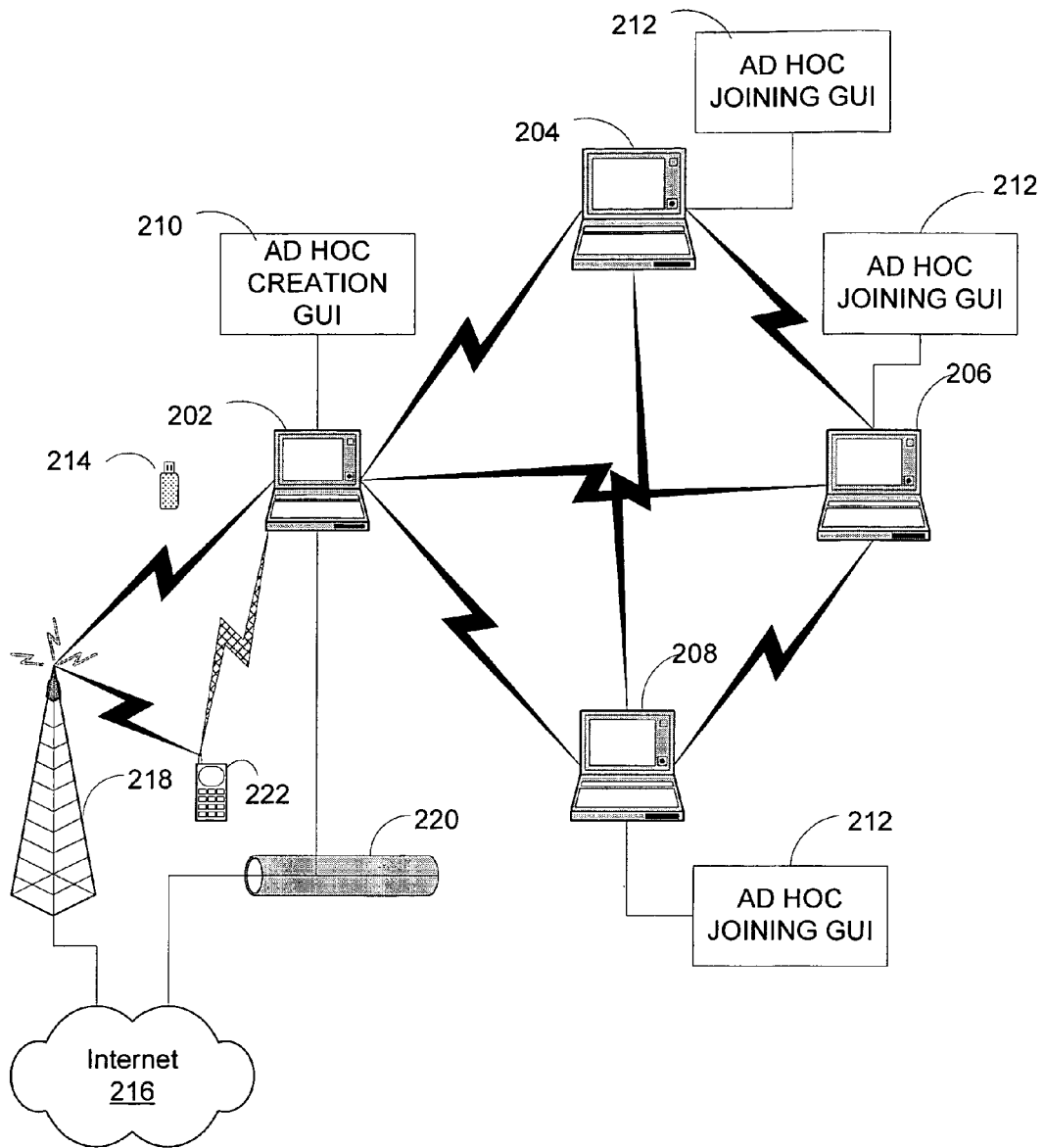
FIG. 2 is a diagram illustrating a scenario in which an ad hoc network is created and joined with Internet connection sharing, in accordance with an embodiment of the invention.

An exemplary scenario in which embodiments of the invention can be used is shown in FIG. 2 and described in the following overview. Users of four computing devices 202, 204, 206 and 208 have gathered and wish to create an ad hoc wireless network to enable mutual sharing of files, or playing of a networked game. Each of the computing devices 202, 204, 206 and 208 is equipped with a wireless adapter, preferably according to an IEEE 802.11 protocol. An embodiment of the invention provides a graphical user interface (GUI) 210 on computing device 202, through which its user is guided into creating an ad hoc network. Associated with the network are, preferably, a name (SSID), authentication model, and termination method. The name, authentication model and termination method can be chosen by the user of computing device 202, or alternatively may be selected automatically by the computing device 202, perhaps according to one or more default settings. For example, the authentication model can be a passphrase chosen by the user, or a randomly selected phrase selected by the computing device 202, or some other authentication model.

Once the user of computing device 202 has completed the steps of the GUI 210, he is prompted to communicate network information "out-of-band" to another user who wishes to join the network. For example, if the user chose the name "John's Network" and a passphrase of "I was talking to the duck!", the GUI 210 would prompt the user: "Tell the next user to join 'John's Network' using the passphrase 'I was talking to the duck!'". The user would then communicate this information to the users of computing devices 204, 206 and 208. The users of computing devices 204, 206 and 208 each attempt to join the ad hoc network by using a GUI 212 for joining. The GUI 212 prompts the users with the names of available networks, including "John's Network." When the users select "John's Network", the GUI 212 prompts them to enter the correct passphrase, and informs them that the passphrase should be available from the user who set up the ad hoc network.

Alternatively, the user of computing device 202 does not communicate the network information directly to the other users, but instead uses the GUI 210 to save the necessary network information to a storage device 214, such as a USB flash drive or the like. The GUI 210 further prompts the user to pass the storage device 214 to another user who wishes to join the ad hoc network. A user of, for example, computing device 204 obtains the storage device 214 and is prompted by GUI 212 to insert the device 214, and the network information is transferred into the user's computing device 204. The GUI 212 further prompts the user to pass the storage device 214 to another user who wishes to join the ad hoc network.

Additionally, the initiating computing device 202 preferably has access to software for managing the dispensing of IP addresses to networked devices (such as DHCP services), and for discovering other devices' IP addresses (such as DNS services). Once all the computing devices 204, 206 and 208 have joined the ad hoc network created by the initiating computing device 202, each device has a unique, discoverable IP address within the network, and all the computing devices can share files or play a networked game, as desired.

In the example of FIG. 2, computing device 202 is additionally connected to the Internet 216. Computing device 202 preferably contains at least two network adapters: one an 802.11 wireless adapter for connecting to the ad hoc network; the other an Ethernet, GPRS, Bluetooth, or other type of adapter for connecting to a wide-area network and/or the Internet 216 via a GPRS tower 218, local area network 220, or Bluetooth networked device 222. In an embodiment of the invention, the GUI 210 provides the user of computing device 202 with the option to share its connection to the Internet 216. If the user selects this option, then computing devices 204, 206 and 208 are automatically provided with necessary networking information, including, for example, temporary Internet Protocol address and domain name resolution services, in order to communicate with the Internet 216 via computing device 202.

The ad hoc network created by computing device 202 in FIG. 1 can be terminated in any number of ways, as preferably configured by its user through the GUI 210. For example, the ad hoc network can be configured to terminate after a preset amount of time (a "time-to-live" or "TTL"). Alternatively, the ad hoc network can be configured such that if a computing device's signal quality to the network becomes sufficiently weak, then it is disconnected from the ad hoc network and it reverts to its previous network settings. Alternatively, the ad hoc network can be configured to allow only manual termination, so that a user must affirmatively choose to leave the network. Countless other variations are possible, and are encompassed within embodiments of the invention.

Figure 3:
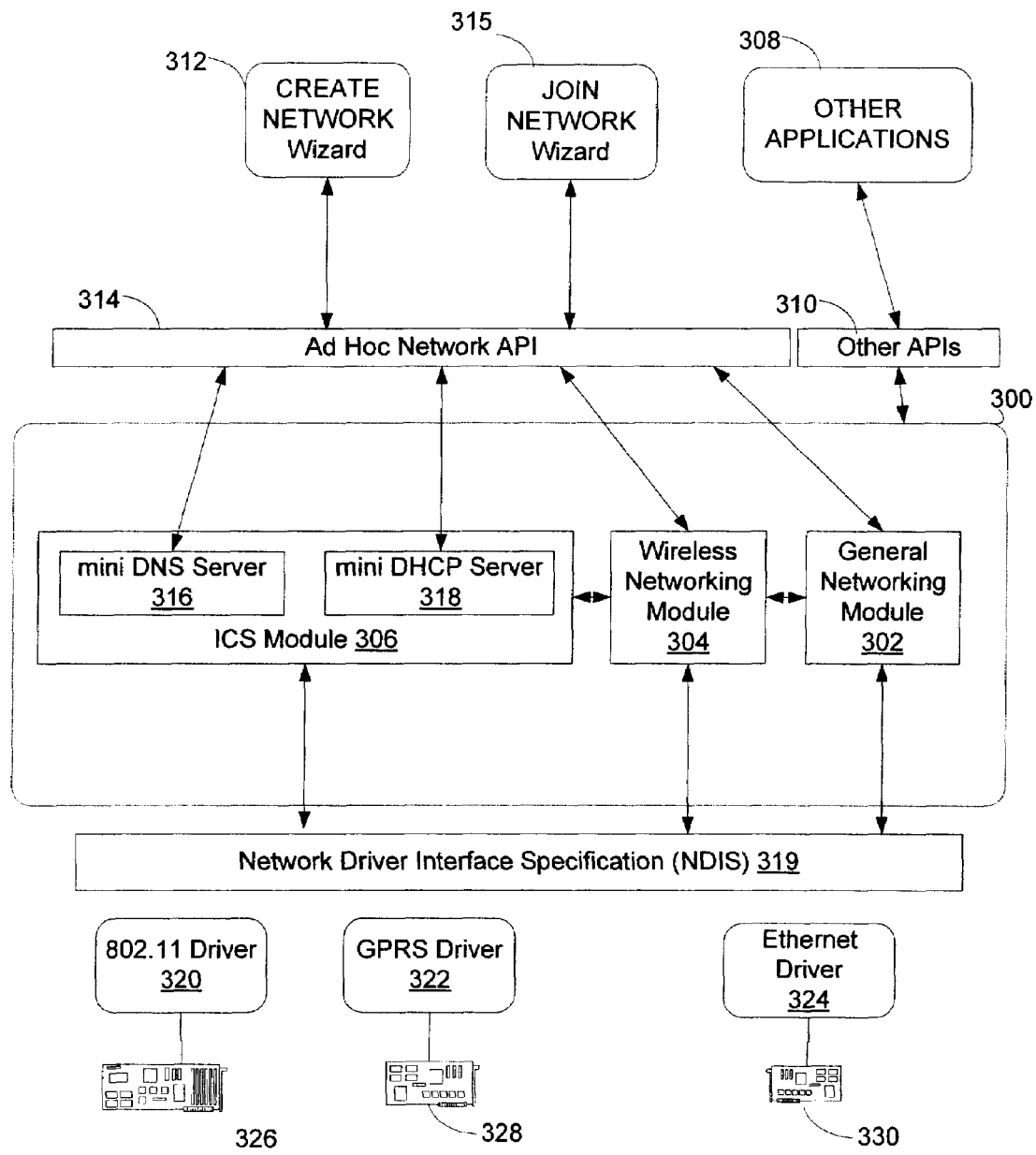
FIG. 3 is an architectural diagram illustrating components of a system for carrying out simplified creation and joining for ad hoc networks, in accordance with an embodiment of the invention.

In an embodiment of the invention, a system for creating and terminating an ad hoc network with internet connection sharing consists of several components, as illustrated in FIG. 3. A computing device typically comprises an operating system 300, such as one member of the MICROSOFT WINDOWS family of operating systems. Within the operating system 300 are several sub-components or modules, including, for example, a general networking module 302, a wireless networking module 304 and an Internet Connection Sharing (ICS) module 306. Applications 308 running on the computing device generally communicate high-level commands to the operating system 300 through application programming interfaces (APIs) 310. As illustrated in FIG. 3, a particular application for creating an ad hoc network is a graphical user interface "wizard" application 312, communicating with the operating system 300 through an ad hoc network API 314. Similarly, a wizard application 314 is used for joining an ad hoc network. The ad hoc network API 314 communicates with the wireless networking module 304 and the ICS module 306. In particular, the API 314 communicates directly with subcomponents of the ICS module 306: a mini domain name service (DNS) server 316 and a mini DHCP server 318. Prior to the present invention, it was not possible to communicate directly with these subcomponents; embodiments of the invention effectively unbundle them from the more general ICS module 306.

The operating system 300 communicates through a Network Driver Interface Specification (NDIS) layer 319 to hardware specific software drivers, such as an 802.11 driver 320, a GPRS driver 322 and an Ethernet driver 324. The drivers communicate low-level commands with network adapter hardware, such as an 802.11 (Wi-Fi) card 326, a GPRS card 328 or a Network Interface Card (NIC) 330.

Figure 4:
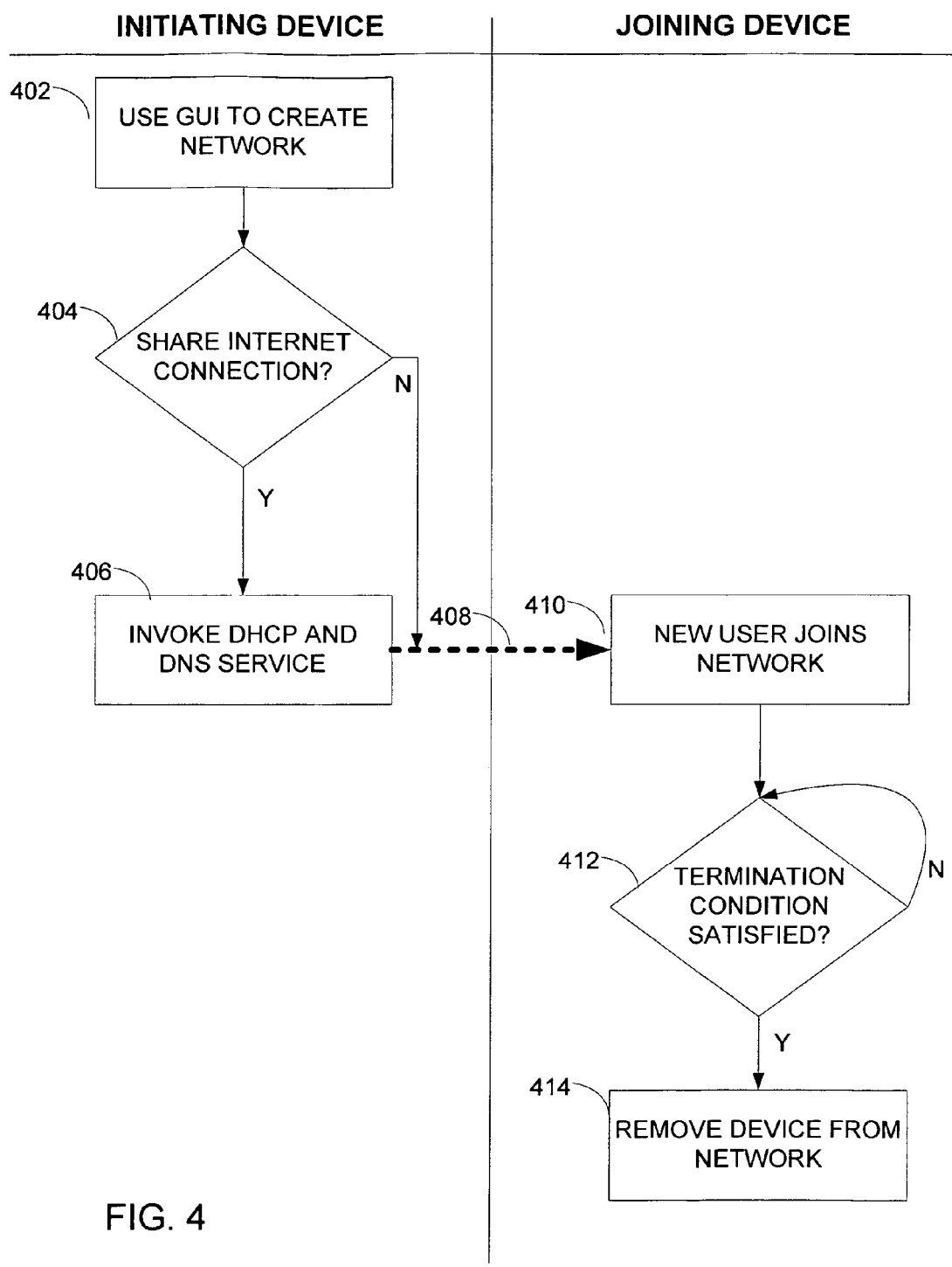
FIG. 4 is a flow diagram illustrating a method of creating and joining an ad hoc network, in accordance with an embodiment of the invention.

Turning to FIG. 4, a general method is shown for simplified creation and termination of an ad hoc wireless network with Internet connection sharing, in accordance with an embodiment of the invention. At step 402, the user of a creating computing device uses a graphical user interface to set up an ad hoc network, inputting configuration parameters as necessary. The user has an option at step 404 to share a connection he may have to the Internet via a second network adapter on the computing device. If the user chooses to share an Internet connection, DHCP and DNS services are invoked at step 406. Alternatively, DHCP and DNS services (or other name resolution services) are invoked regardless of whether the user chooses to share an Internet connection. At step 408, information necessary for joining the ad hoc network is communicated "out-of-band" (e.g., by voice, USB flash drive, etc.) to another user. The other user uses the communicated information with a graphical user interface to join the ad hoc network at step 410. Additional users can join the network by repeating steps 408 and 410. Network functions are available for the creating user and joining user until a termination condition is satisfied at step 412. At that point, the user's computing device is removed from the ad hoc network at step 414, the device reverts to its previous network settings, and is available for joining or creating another wireless network.

Figure 5:
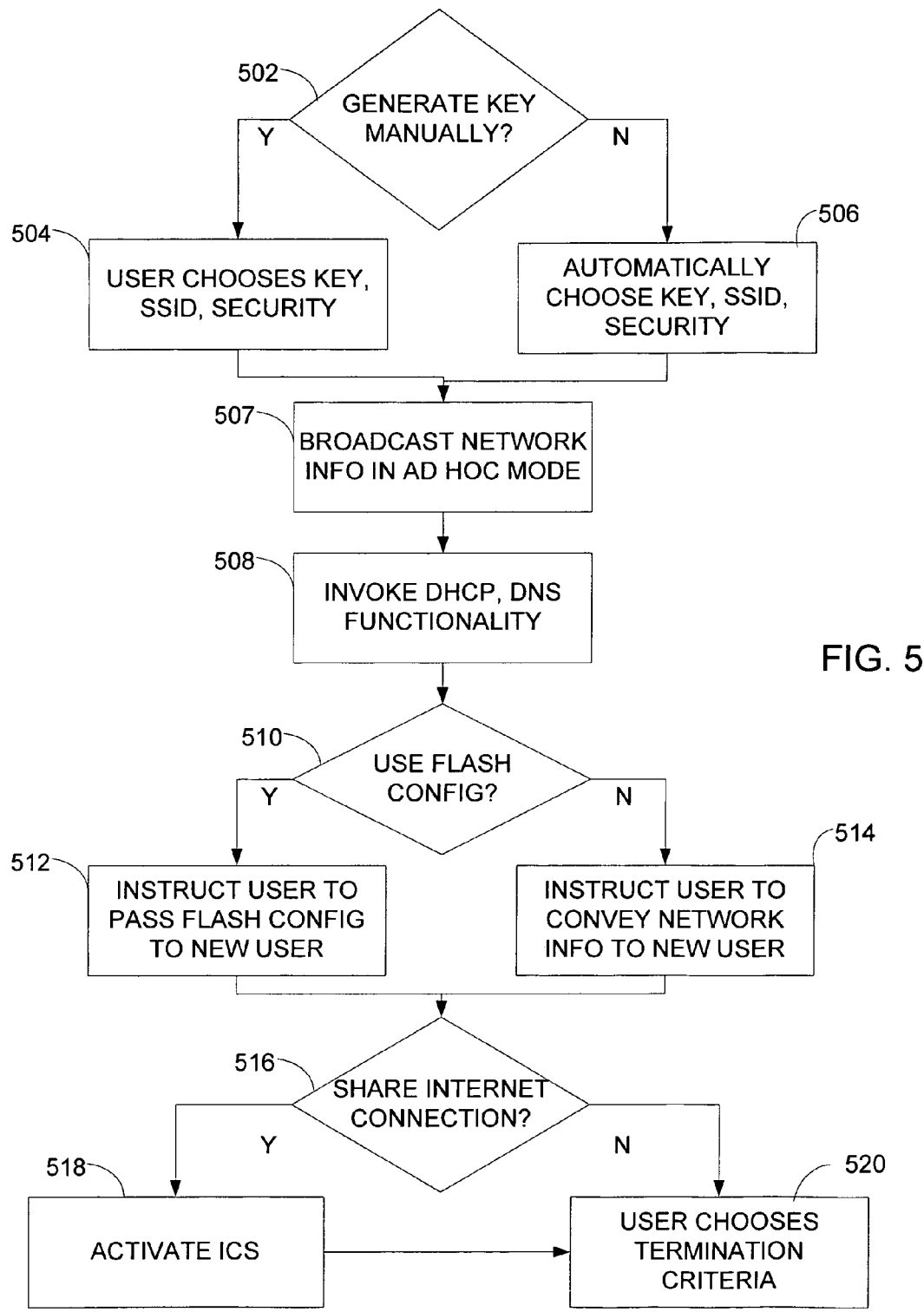
FIG. 5 is a flow diagram illustrating a method of creating an ad hoc network, in accordance with an embodiment of the invention.

In more detail, a method for setting up an ad hoc network on a computing device is shown in FIG. 5, in accordance with an embodiment of the invention. The user of the device first is presented at step 502 with an option for manual or automatic SSID and network key generation. The network key corresponds to a network security method or authentication model, such as WEP or WPA. If the user chooses the manual option, then at step 504 the user chooses a key, along with a network name (SSID). Additionally, the user can choose a level of network security, such as WEP or WPA, for example. Alternatively, the user can generate a passphrase, random string, graphical picture, or other representation that is converted into a network key and SSID. If the user chooses the automatic option, then at step 506 the computing device selects some or all of the network configuration parameters. Networking modules in the device take this information and at step 507 start broadcasting the new SSID in ad hoc mode.

The method continues at step 508, where the computing device simulates a managed network by invoking DHCP functionality for assigning and managing IP addresses of networked devices, and DNS functionality for managing name/IP resolution for networked devices. The simulation is preferably performed by directly accessing those subfunctions of an Internet Connection Sharing component within the device's operating system. Alternatively, the computing device does not use DNS for name resolution between devices and/or the computing device does not use DHCP originated addresses. In their place, it uses instead Link Local Multicast Name Resolution (LLMNR) to provide link layer name resolution between devices, and self-assigned AutoNet (169.254.x.x) IPv4 addresses. Alternatively, if all other devices to be networked support IPv6 and LLMNR then all the devices already have link local addresses and LLMNR is used for local resolution.

At step 510, the user is presented with an option of whether a USB Flash Drive configuration device will be used to transmit the ad hoc network information to the other users. If so, the user is instructed to insert a USB flash drive configuration device, remove it, and pass it to another user who wishes to join the network at step 512. Otherwise, the user is instructed to transmit the network information to another user in any of a number of ways at step 514. For example, the user can be instructed simply to tell the other user the SSID and network key verbally. Or he could be instructed to write the passphrase on a chalkboard.

At step 516, the user is asked whether he wishes to share an Internet connection. In one embodiment, step 516 is only performed if an Internet connection is detected on the computing device. If the user chooses to share his connection, then the ICS feature of the operating system is activated at step 518 to allow other networked devices to access the Internet through the user's device. The user is also presented at step 520 with an option to choose the ad hoc network termination criteria. A wide variety of criteria are preferably made available, such that if the chosen criterion is satisfied, then the ad hoc network is automatically terminated and cleaned. For example, some criteria are a pre-set Time-To-Live and a signal quality threshold. Alternatively, an option for manual termination is presented, so that no automatic termination takes place.

Figure 6:
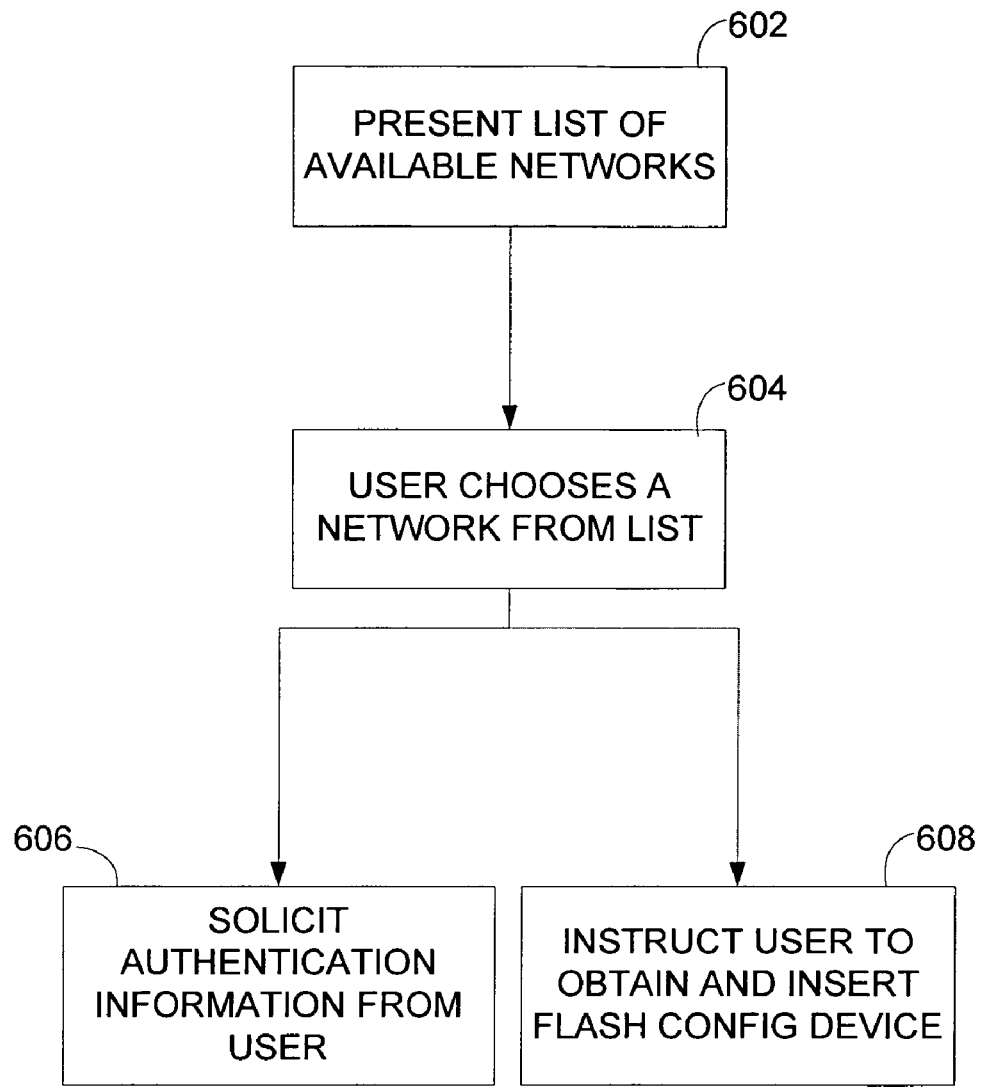
FIG. 6 is a flow diagram illustrating a method of joining an ad hoc network, in accordance with an embodiment of the invention.

In more detail, a method for a computing device to join an ad hoc network is shown in FIG. 6, in accordance with an embodiment of the invention. The user of the device first is presented at step 602 with a list of visible wireless networks to potentially join, preferably along with additional information about each network (such as whether it requires additional user input, or a password, etc.). The user chooses at step 604 one of the networks listed and is prompted at step 606 to enter authentication information for accessing the network. The authentication information can take the form of a password, passphrase, visual symbol, or other form as determined by the network creator. Along with the prompt for authentication information, the user can be instructed to contact the network initiator in order to receive the information "out-of-band", in a manner consistent with how the network initiator was instructed to transmit the information (e.g., verbal, on a chalkboard, etc.). Alternatively, the user is instructed at step 608 to obtain a USB Flash Drive configuration device from a current participant in the ad hoc network and to insert it into a USB port on his computing device, thereby transferring the necessary network information. In one embodiment, the user inserts the USB Flash Drive into his computing device without any prompting or user interface, and the network information is automatically transferred to the computing device; the device can then be automatically joined to the ad hoc network without any user intervention. Additional details on the use of a USB Flash Drive in this manner can be found in co-pending application Ser. No. 10/806,836, filed Mar. 23, 2004 by Manchester, et al., entitled "CONFIGURING AN AD HOC WIRELESS NETWORK USING A PORTABLE MEDIA DEVICE" which is hereby incorporated by reference in its entirety for all that it teaches without exclusion of any part thereof.

Figure 7:
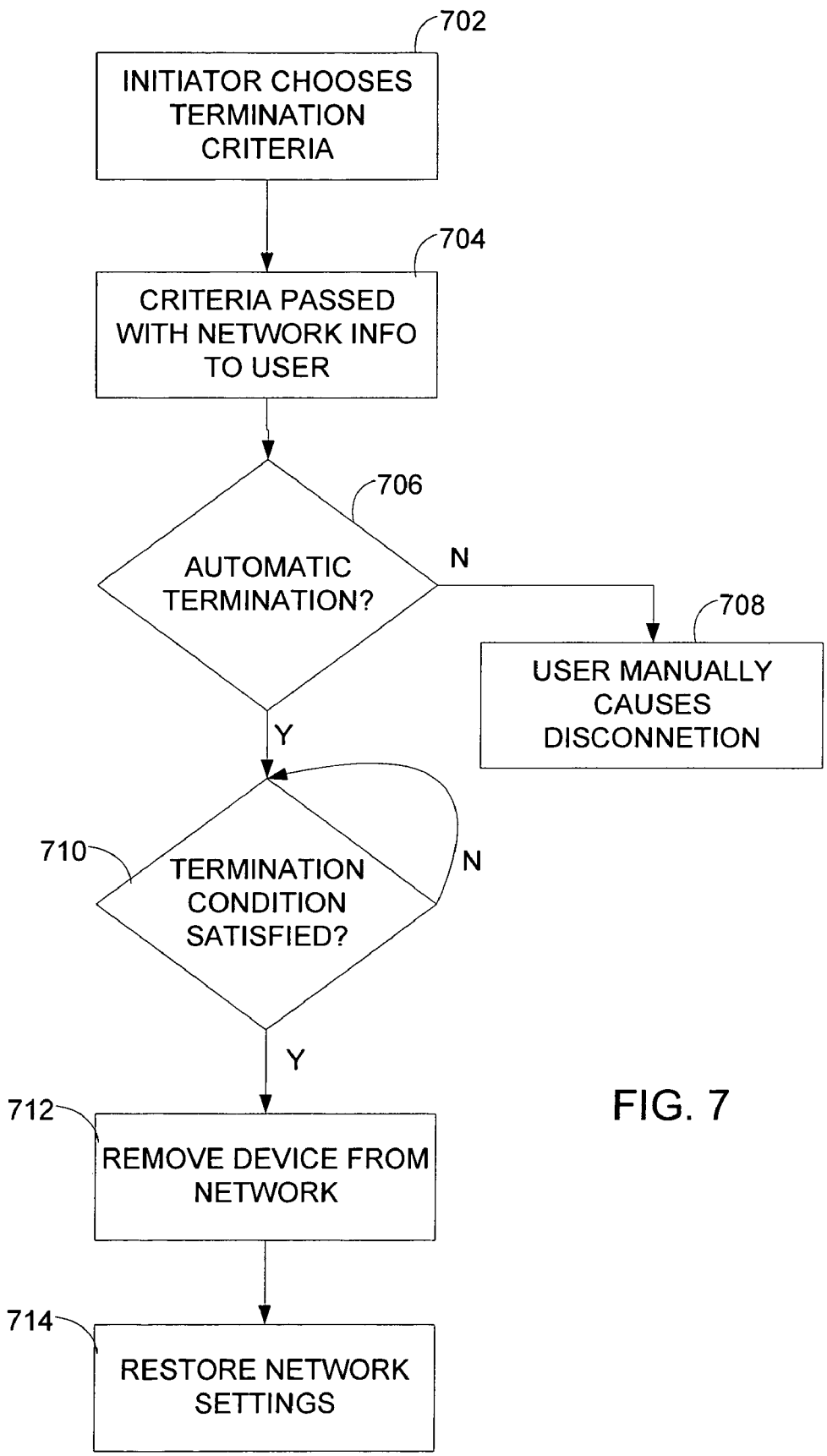
FIG. 7 is a flow diagram illustrating a method of terminating connection to an ad hoc network, in accordance with an embodiment of the invention.

Turning to FIG. 7, a more detailed process for terminating connection to an ad hoc network is illustrated, in accordance with an embodiment of the invention. In order to terminate a computing device's connection to the ad hoc wireless network, either an automatic or manual process is taken. The choice between automatic and manual, and the particular termination criteria, are preferably chosen by the initiator of the network at step 702, and are passed to the joining device within the setup information transferred by the initiator at step 704. At step 706, the device determines if termination is to be automatic or manual. If it is manual, then no network settings are adjusted until the user of the device intervenes at step 708. If automatic, then the device continuously monitors the termination criteria at step 710. As discussed earlier, the termination criteria can take any of a number of forms, including, for example: a time-to-live to set a fixed lifetime for the network; if signal quality drops below some threshold value for some duration of time; if no other devices are visible on the ad hoc network; if the user of a networked device is logging out of his system; combinations of the above; and others. If the termination criteria is met, then the device disconnects from the ad hoc network at step 712 and restores its network settings to their previous state at step 714.

Figure 8:
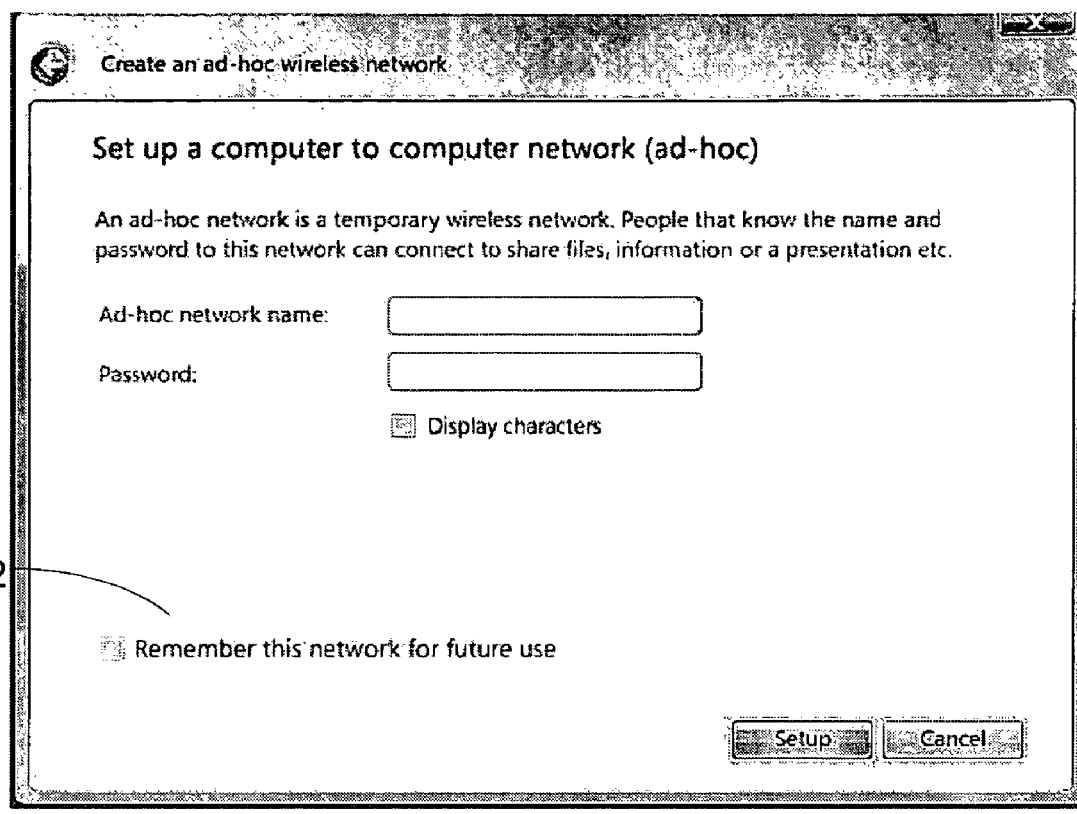
FIGS. 8-11 are screenshots illustrating exemplary user interfaces for creating an ad hoc network with Internet connection sharing, in accordance with an embodiment of the invention.
Figure 9:
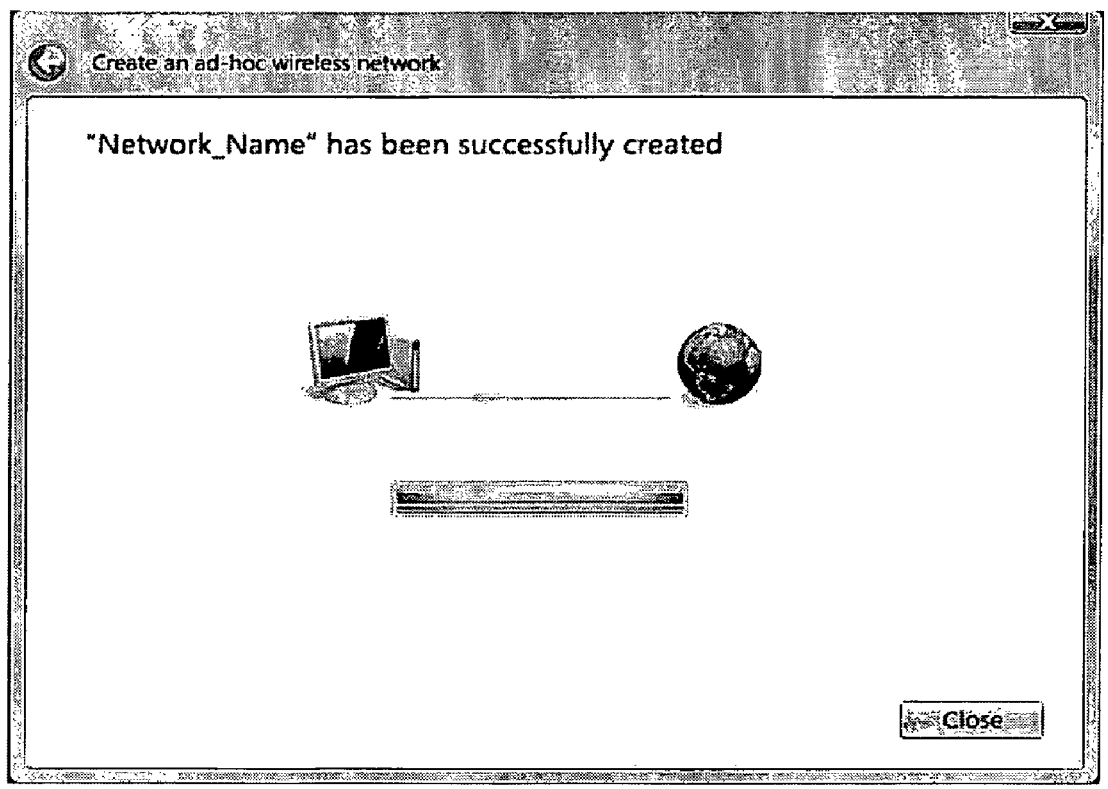
Figure 10:
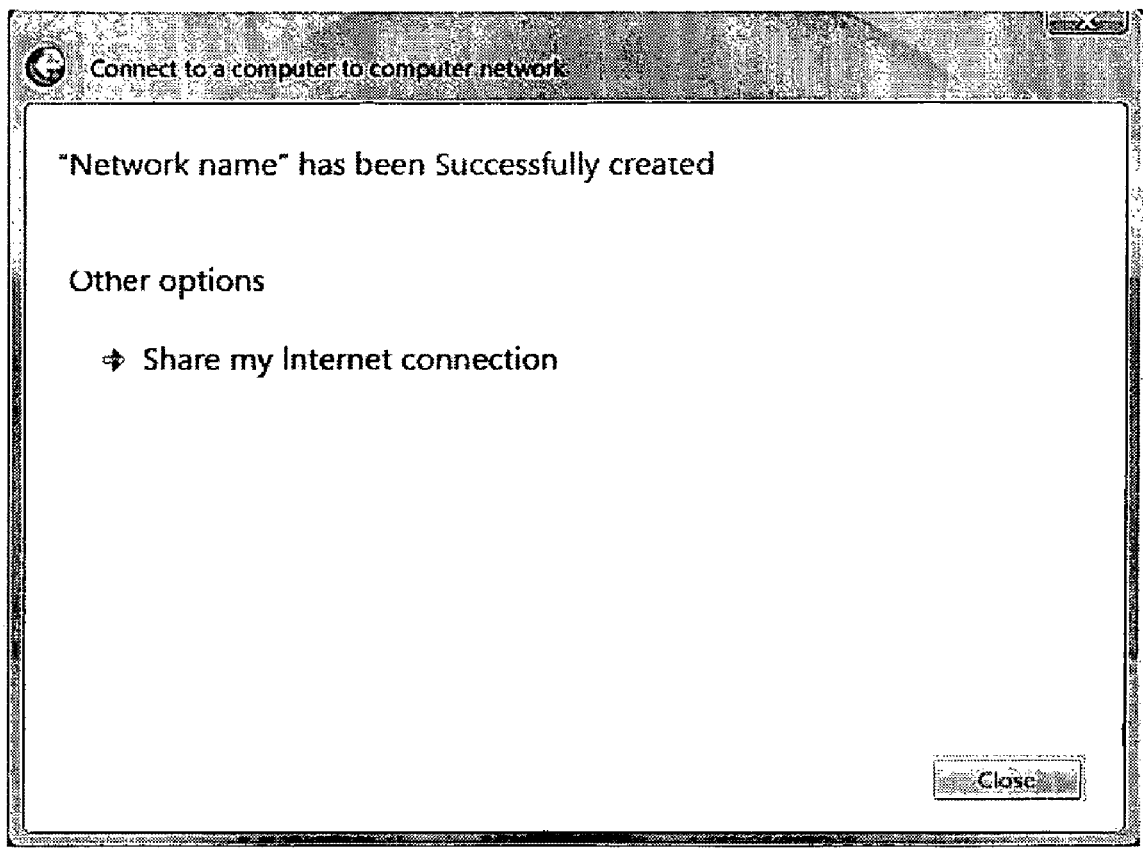
Figure 11:
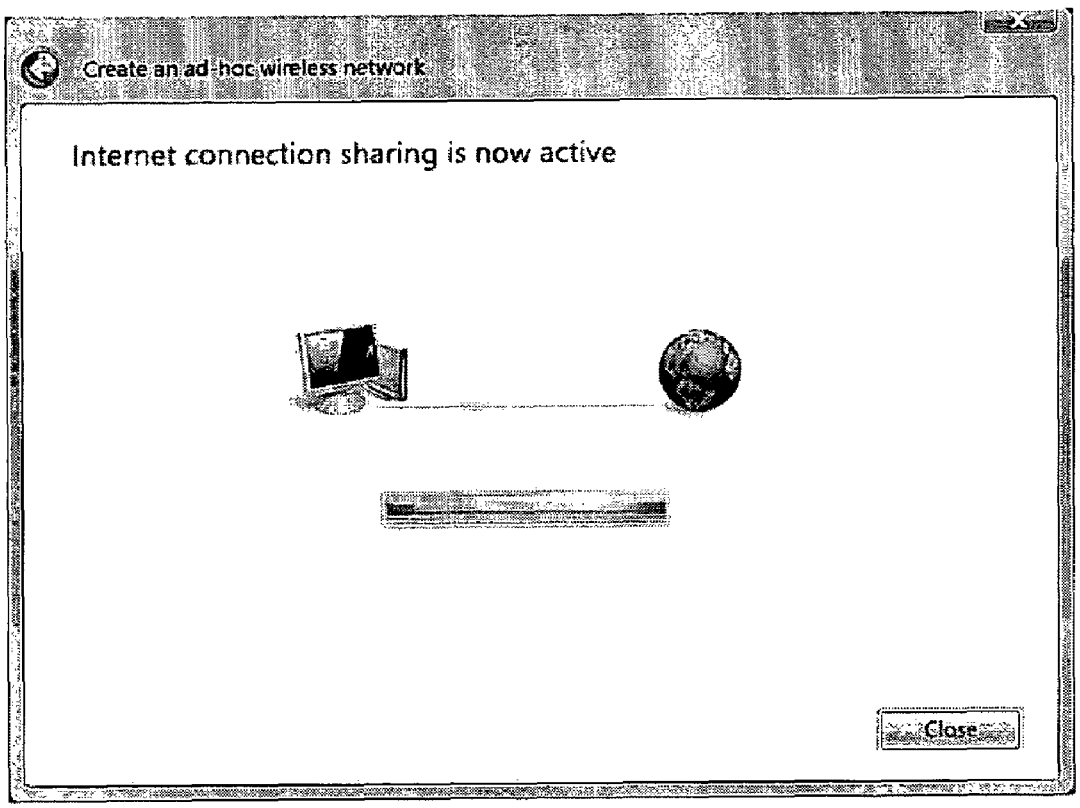

FIGS. 8-11 are examples of graphical user interfaces through which users can create an ad hoc network with an option of sharing an internet connection, in accordance with an embodiment of the invention. FIG. 8 is an interface through which a user can create a network name (SSID) and password for an ad hoc network. An option 802 is given for the user to choose whether the network should be remembered for future use. This allows the same network settings (e.g., SSID, passphrase, etc.) to be reused at another time. Once the network is created, the user is given acknowledgement through an interface such as the one shown in FIG. 9. FIG. 10 gives an example of an interface presented to a user once he has set up an ad hoc network, whereby the user can choose whether or not to share his Internet connection with other members of the ad hoc network. In one embodiment, the interface of FIG. 10 is only presented after determining that the computing device has an Internet connection. The user is given acknowledgement that Internet connection sharing is active through an interface such as the one of FIG. 11.

Figure 12:
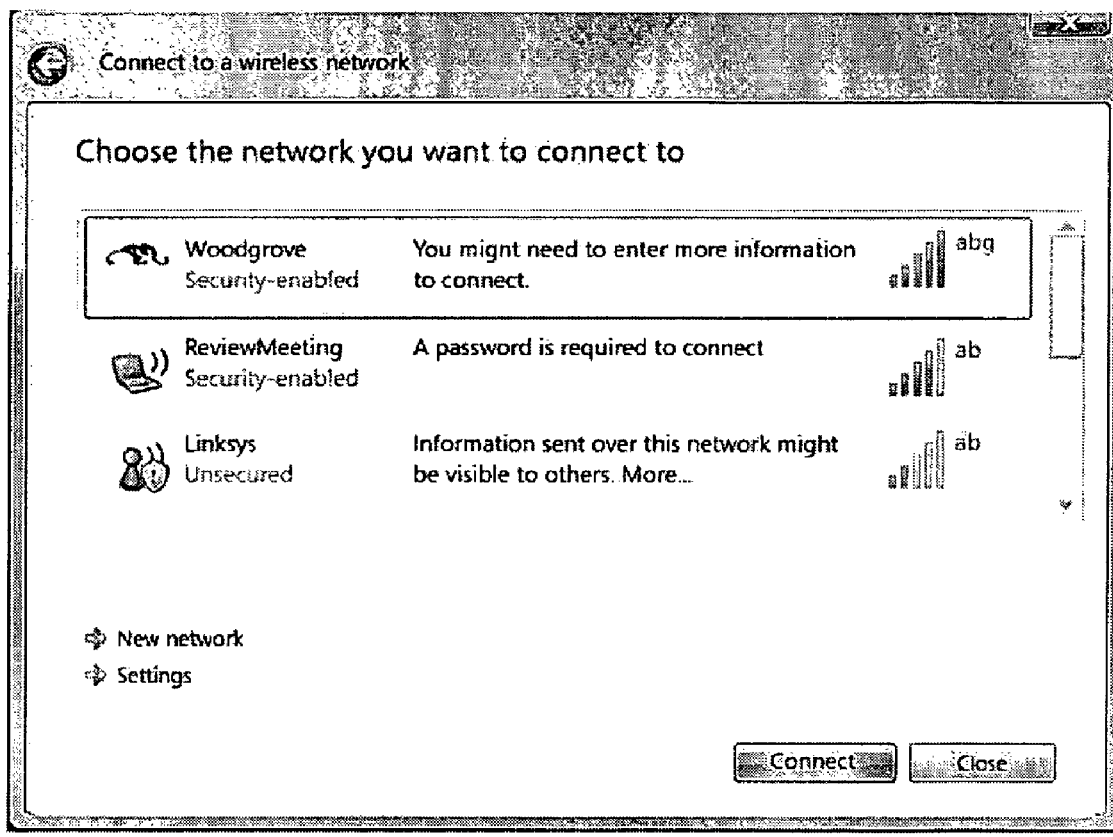
FIGS. 12-14 are screenshots illustrating exemplary user interfaces for joining an ad hoc network, in accordance with an embodiment of the invention.
Figure 13:
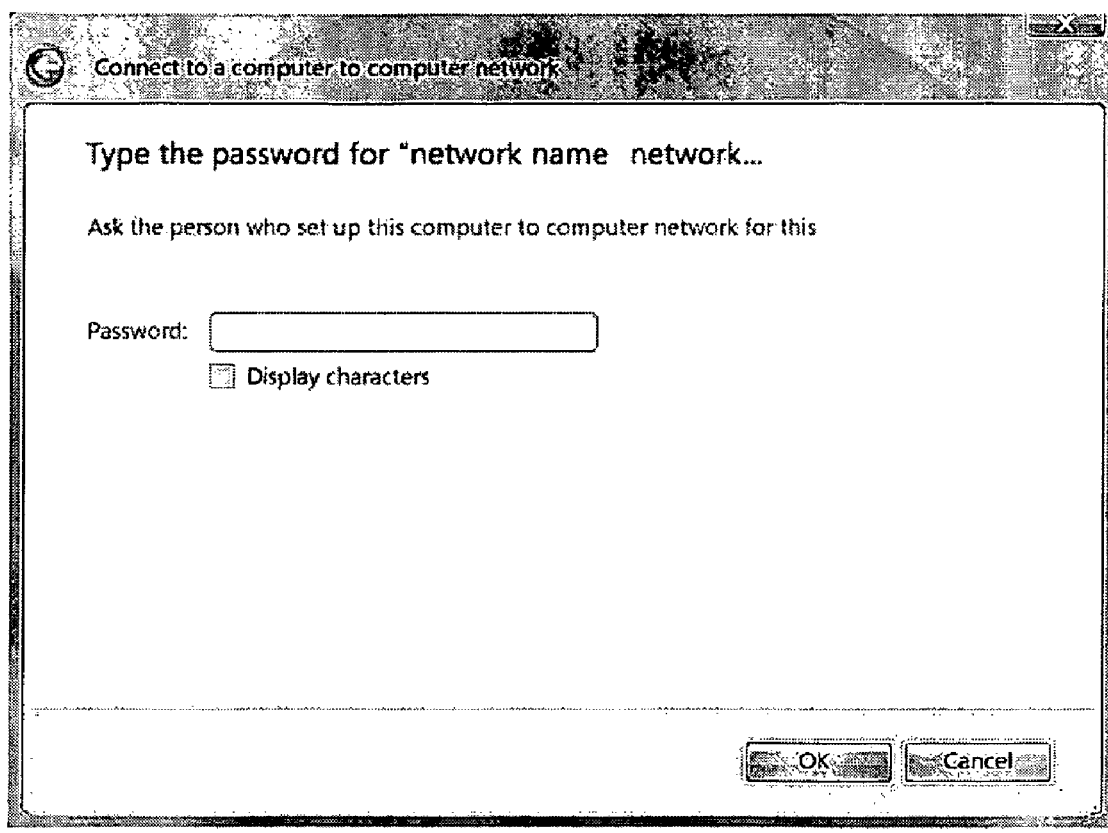
Figure 14:
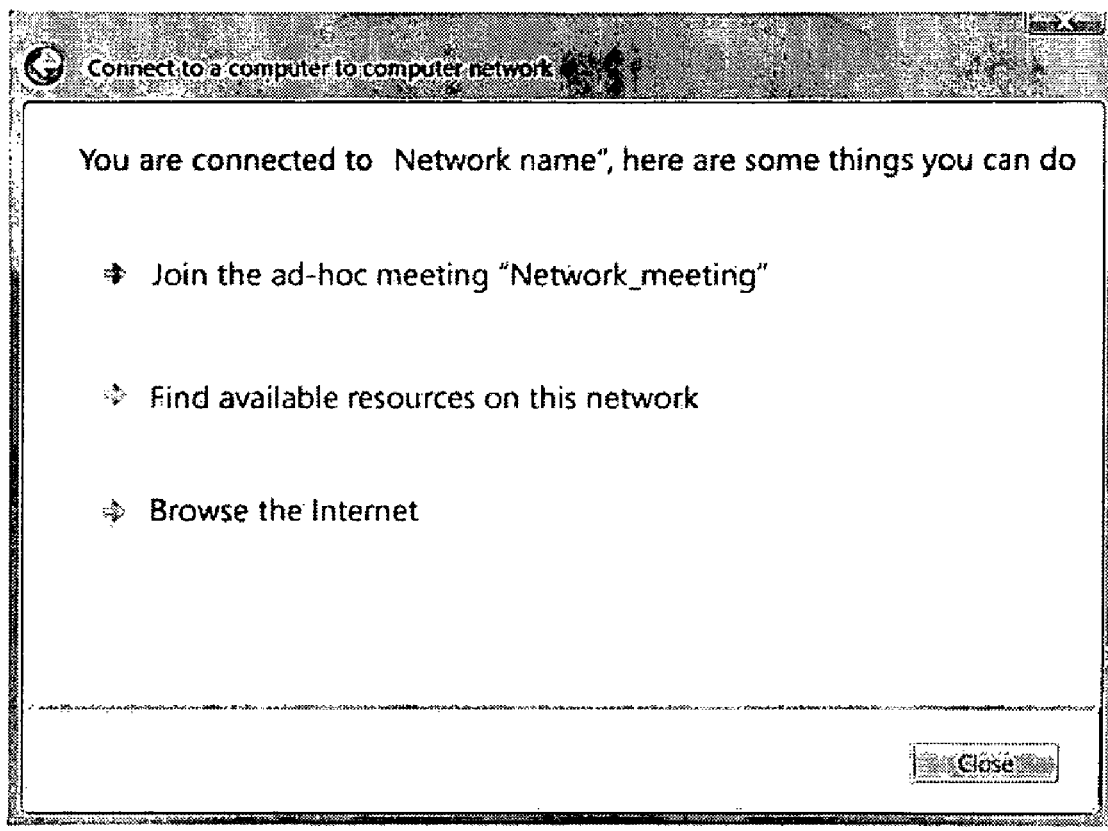

FIGS. 12-14 are examples of graphical user interfaces through which users can join an ad hoc, in accordance with an embodiment of the invention. FIG. 12 shows an interface presenting the user with visible networks to potentially join, along with information about the networks, such as the networks' security settings, 802.11 protocol, authentication requirements for logging in, etc. After choosing a network, the user can be presented with an interface such as the one shown in FIG. 13, which instructs the user to ask the initiator for a password for the ad hoc network. Upon entering the correct password, the user's device is connected to ad hoc network, as acknowledged in the interface of FIG. 14. Additionally, several alternatives can be presented to the user at this point, such as running particular networked applications (network meeting software, games, etc.) or finding available network resources. Also, if the initiator of the ad hoc network enabled Internet connection sharing, an option to browse the Internet can be presented to the joining user.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method for establishing an ad hoc wireless network performable by a first computing device, the first computing device comprising a first wireless network adapter for communicating with the ad hoc network, and further comprising a second network adapter for communicating with a second network with, the method comprising the steps of:
   guiding a user of the first computing device through a process for generating network configuration parameters for creating the ad hoc network;
   informing the user of at least one method for transferring the network configuration parameters to a second computing device, by which the second computing device can connect to the ad hoc network;
   allowing the second computing device to communicate with the second network through the ad hoc network and the second network adapter on the first computing device;
   invoking a network protocol address assignment server on the first computing device to assign a network address to the second computing device after the second computing device has connected to the ad hoc network; and
   invoking a name resolution server on the first computing device to provide name resolution service to the second computing device.

2. The method of claim 1 further comprising the steps of:
   informing the user to insert a temporary storage device for storing the network configuration parameters;
   wherein the at least one method for transferring the network configuration parameters comprises removing the temporary storage device and giving it to a user of the second computing device.

3. The method of claim 1 wherein the network configuration parameters comprise one or more of:
   a network name;
   authentication information; and
   termination criteria.

4. The method of claim 1 further comprising the steps of:
   terminating the second computing device connection with the second network through the ad hoc network and the second network adapter on the first computing device upon determination that termination criteria have been met.

5. The method of claim 4 wherein the termination criteria comprises one or more of:
- wireless signal quality to the ad hoc network falling below a threshold value;
- other computing devices becoming disconnected from the ad hoc network;
- initiation of a logout or shutdown process; and
- passage of a fixed duration of time.

6. A tangible storage medium having a stored computer instructions to execute the method of claim 1.

7. A system for establishing an ad hoc wireless network between two or more computing devices, each computing device comprising a wireless network adapter for communicating with the ad hoc network, the system comprising:
- an ad hoc network initiator user interface for execution on a first computing device;
- a transfer mechanism for transferring an ad hoc network configuration information from the first computing device to one or more other computing devices;
- an ad hoc network joining user interface for execution on the one or more other computing devices; and
- wherein the ad hoc network initiator user interface provides user instruction for using the transfer mechanism to convey the network configuration information, a first option within the initiator user interface for sharing a second network connection with the one or more other computing devices via an additional network adapter on the first computing device, and the ad hoc network joining user interface provides user instruction for using the transfer mechanism to input the conveyed network configuration information onto the one or more computing devices.

8. The system of claim 7 further comprising:
- a network protocol address assignment server for execution on the first computing device to assign a network address to the one or more other computing devices after the one or more other computing devices has connected to the ad hoc network; and
- a name resolution server for execution on the first computing device to provide name resolution service to the one or more other computing devices.

9. The system of claim 7 further comprising:
- a second option within the ad hoc network initiator user interface for selecting a method by which the ad hoc network can be automatically terminated.

10. A method for configuring an ad hoc wireless network connection, sharing a second network connection, and terminating one or both the connections performable by a first computing device, the first computing device comprising a first wireless network adapter for communicating with the ad hoc wireless network connection, and further comprising a second network adapter for sharing the second network connection with one or more other computing devices, the method comprising:
- guiding a user of the first computing device through a process for generating network configuration parameters for creating the ad hoc wireless network connection;
- informing the user of at least one method for transferring the network configuration parameters to one or more other computing devices, by which the one or more other computing devices can connect to the ad hoc wireless network connection;
- allowing users of the one or more other computing devices for joining the ad hoc wireless network connection associated with the transferred network configuration parameters;
- sharing the second network connection with the one or more other computing devices through the ad hoc wireless network connection and the second network adapter on the first computing device, sharing the second network connection comprises invoking a network protocol address assignment server and a domain name resolution server on the first computing device to provide a network protocol address and a domain name resolution service to the one or more other computing devices; and
- terminating one or both the connections with the one or more other computing devices upon termination criteria have been met, terminating one or both the connections comprises one or more of wireless signal quality to the ad hoc wireless network connection falling below a threshold value, one or more other computing devices becoming disconnected from the ad hoc wireless network connection, initiation of a logout or shutdown process, and passage of a fixed duration of time.

11. The method of claim 10, wherein informing the user of at least one method for transferring the network configuration parameters to one or more other computing devices comprises informing the user to insert a temporary storage device for storing the network configuration parameters, removing the temporary storage device, and giving the temporary storage device to the users of the one or more other computing devices.

12. The method of claim 11, wherein the network configuration parameters comprises one or more of:
- a network name;
- authentication information; and
- termination criteria.

13. A tangible storage medium having a stored computer instructions to execute the method of claim 12.

* * * * *

UNITED STATES PATENT AND TRADEMARK OFFICE
CERTIFICATE OF CORRECTION

PATENT NO.       : 7,616,588 B2
APPLICATION NO.  : 11/096042
DATED            : November 10, 2009
INVENTOR(S)      : Gatta et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1187 days.

Signed and Sealed this

Nineteenth Day of October, 2010

David J. Kappos
*Director of the United States Patent and Trademark Office*